Sept. 3, 1968 TAKAO SHIRAI 3,399,855
ARRANGEMENT FOR DETACHABLY SECURING A HELMET
TO A TWO-WHEEL VEHICLE
Filed Sept. 29, 1966 2 Sheets-Sheet 1

*Takao Shirai*

Takao Shirai

United States Patent Office 3,399,855
Patented Sept. 3, 1968

3,399,855
ARRANGEMENT FOR DETACHABLY SECURING A HELMET TO A TWO-WHEEL VEHICLE
Takao Shirai, Tokyo, Japan, assignor to Kabushiki Kaisha Honda Gyutsu Kenkyusho, Saitama-ken, Japan
Filed Sept. 29, 1966, Ser. No. 582,904
Claims priority, application Japan, Dec. 7, 1965, 40/99,868
1 Claim. (Cl. 248—201)

ABSTRACT OF THE DISCLOSURE

A two-wheel vehicle having a headlight, a fuel tank behind the headlight and two brackets on the fuel tank, one for receiving a clasp on one chin strap of a helmet such that the clasp can be locked to the bracket, and another for detachably receiving the other of the chin straps.

---

The present invention relates to apparatus for fastening a helmet to a two-wheel vehicle such as a motorcycle, or the like, for preventing the theft of the helmet. It is contemplated according to the invention that a vehicle body of a two-wheel vehicle such as a motorcycle is provided with a bracket having an opening so that a helmet may be connected thereto by a padlock engaging a clasp loop of the helmet at the end of one of its chin straps.

By utilizing the existing clasp loop of the helmet there is avoided the need for modifying the helmet whereby the invention can be employed with stock helmets.

The bracket may be connected to the vehicle at a portion thereof by welding or other manner of securing. It is also within the contemplation of the invention to form the bracket with a second opening which is adapted for engaging an existing bolt in the body to secure the bracket thereto. Thereby the attachment of the bracket to the vehicle is greatly simplified and requires no modification in the construction of the vehicle.

According to a desirable arrangement, the bracket is so located on the vehicle that the helmet will cover the lens of the headlight when attached to the bracket thereby protecting the lens. For this purpose there may also be provided a second bracket member adapted for the detachable connection of the other of the chin straps of the helmet.

Several embodiments of the present invention will next be described in detail with reference to the accompanying drawings, wherein.

Figure 1:
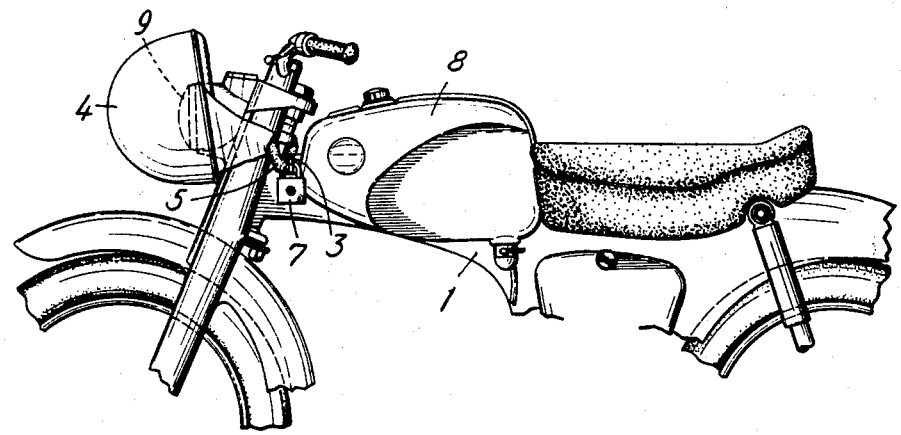
FIGURE 1 is a side view of a part of a two-wheel vehicle having a locking arrangement according to the present invention.
Figure 2:
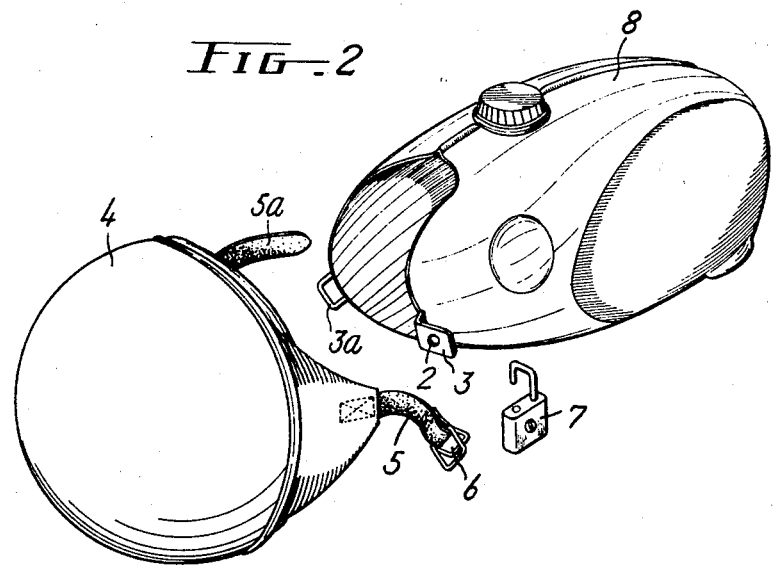
FIGURE 2 is an enlarged perspective view of a part of the arrangement of FIG. 1.

Referring to the drawings, numeral 1 denotes a vehicle body of a two-wheel vehicle. A bracket 3 having an opening 2 is attached to said body so that a helmet 4 may be connected thereto by means of the engagement of a padlock 7 with a clasp loop 6 at the end of a chin strap 5 thereof. The bracket 3 may be located at any place on the vehicle body 1, but preferably, as shown in the embodiment in FIGS. 1 and 2, the bracket is provided at one side of the front portion of a fuel tank 8, so that the helmet 4 can be locked to the bracket and cover a headlight 9. Thus, there is obtained the advantage that the helmet 4 is supported stably on the headlight 9 and serves to protect the lens portion thereof. In this arrangement, another bracket 3a is provided at the other side of the tank 8, so that the other chin strap 5a of the helmet 4 may be tied thereto.

Figure 3:
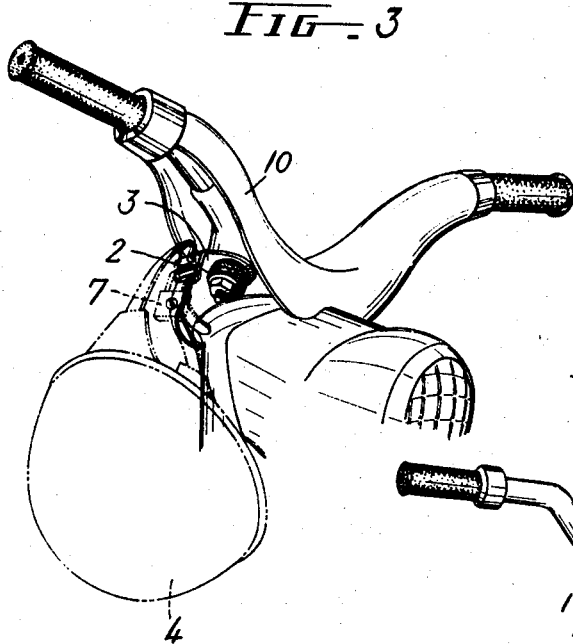
FIGURES 3–5 are perspective views of modified forms of the locking arrangement according to the invention.

In the embodiment shown in FIG. 3, the bracket 3 is attached by welding to the hollowed lower surface of a steering handle 10. This is an advantageous arrangement in that the bracket is concealed and does not spoil the appearance of the vehicle nor constitute an obstruction.

Figure 4:
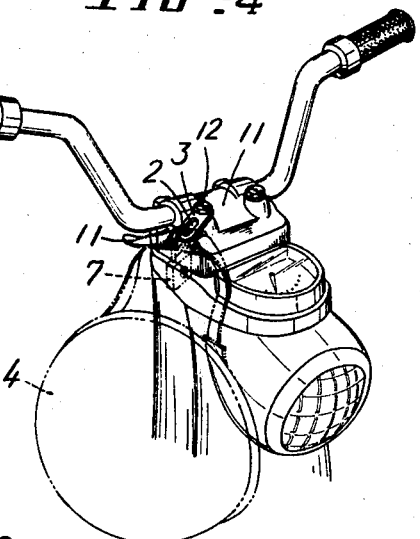
Figure 5:
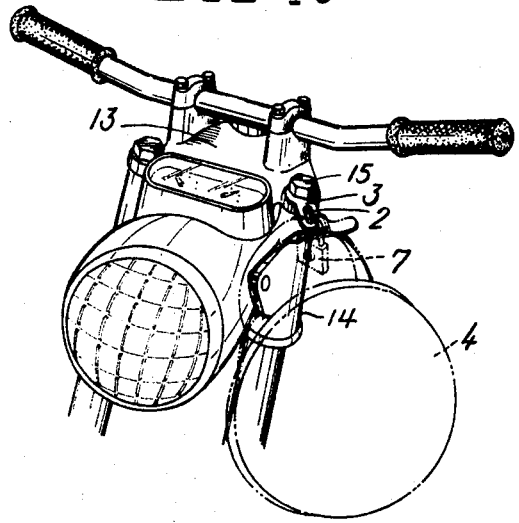

The bracket 3 may be attached to the vehicle by utilizing a bolt 12 which engages clamping members 11 clamped to the bottom of the handle 10 as shown in FIG. 4. The bracket 3 can also be attached to the vehicle by utilizing a bolt 15 which connects the end of a top bridge member 13 to the top of a front fork member 14 as shown in FIG. 5. In these arrangements, there is obtained the advantage that it is only required to form in the bottom end of the bracket 3 an opening for inserting the bolt 12 or 15 and no other separate attaching means is required.

Thus, according to the present invention, it is advantageous that a helmet 4 can be easily locked to a vehicle body 1 for prevention of the theft of the helmet by the simple provision on the vehicle body of a bracket and the supply of a padlock. Moreover, it is not necessary to modify the helmet to form a lock opening since the clasp loop at the end of a chin strap thereof is utilized as an opening for engaging the padlock.

What is claimed is:

1. For the detachable attachment to the body of a two-wheel vehicle of a helmet having a pair of chin straps, one of which is provided with a clasp at the end thereof, said vehicle having a headlight and a fuel tank behind the headlight, a first bracket member having an opening therein, locking means for engaging said clasp and the first bracket member at said opening to detachably connect the helmet to the vehicle body, said bracket member being connected to the fuel tank at an end thereof proximate the headlight so that the helmet covers the headlight when the clasp is secured to the first bracket member by the locking means, and a second bracket member on the fuel tank for detachable connection of the other of the chin straps.

References Cited

UNITED STATES PATENTS

| 223,691 | 1/1880 | Allen | 280—290 X |
| 1,432,589 | 10/1922 | Brazeau | 211—8 X |
| 2,639,208 | 5/1953 | Obenchain | 211—8 X |
| 2,497,797 | 2/1950 | Rogers | 211—8 |

FOREIGN PATENTS

| 262,047 | 10/1929 | Italy. |
| 68,978 | 3/1945 | Norway. |

CHANCELLOR E. HARRIS, *Primary Examiner.*